(12) United States Patent
Ma

(10) Patent No.: US 8,300,183 B2
(45) Date of Patent: Oct. 30, 2012

(54) SINGLE LAYER HIGH BRIGHTNESS FULL COLOR REFLECTIVE CHOLESTERIC DISPLAYS

(75) Inventor: Yao-Dong Ma, Frisco, TX (US)

(73) Assignee: MacroDisplay Inc., Richardson, TX (US)

(*) Notice: Subject to any disclaimer, the term of this patent is extended or adjusted under 35 U.S.C. 154(b) by 229 days.

(21) Appl. No.: 12/927,445

(22) Filed: Nov. 15, 2010

(65) Prior Publication Data

US 2012/0120350 A1     May 17, 2012

(51) Int. Cl.
G02F 1/1335    (2006.01)

(52) U.S. Cl. ............. 349/98; 349/97; 349/96; 349/106; 349/113

(58) Field of Classification Search .................... 349/98, 349/97, 96, 106, 113
See application file for complete search history.

(56) References Cited

U.S. PATENT DOCUMENTS

| | | | |
|---|---|---|---|
| 6,597,418 B2 * | 7/2003 | Moon et al. ..................... | 349/98 |
| 6,717,639 B2 * | 4/2004 | Jung ............................. | 349/106 |
| 2003/0160923 A1 * | 8/2003 | Ma ................................. | 349/115 |
| 2005/0057707 A1 * | 3/2005 | Ma ................................. | 349/98 |
| 2008/0018833 A1 * | 1/2008 | Ma ................................. | 349/98 |

* cited by examiner

*Primary Examiner* — Mike Qi

(57) ABSTRACT

The present invention relates to a liquid crystal display, more specifically, to a single layer reflective full color cholesteric display employing full spectrum circularly polarization. The display has not only zero-field long time memory but also paper-like super high brightness and contrast.

20 Claims, 3 Drawing Sheets

SINGLE LAYER HIGH BRIGHTNESS FULL COLOR REFLECTIVE CHOLESTERIC DISPLAYS

FIELD OF THE INVENTION

The present invention relates to a liquid crystal display, more specifically, to a single layer reflective full color cholesteric display employing full spectrum circularly polarization. The display has not only zero-field long time memory but also paper-like super high brightness and contrast.

BACKGROUND OF THE INVENTION

Liquid crystal display devices comprising polarizers and micro-color filter components are utilized in various flat panel displays. Reflective displays with full color capability are currently top-of-the-line products for portable electronics. Such reflective full color performance meets its basic requirement of high-information-content displays for a simple reason of less power consumption and thinner structure compared with the backlit counterparts. The typical reflective displays, nowadays, are reflective thin film transistor (TFT) display and reflective STN display. However, the overall performances of the reflective displays are still not as good as the transmissive backlit mode in terms of brightness, contrast ratio and viewing angle. And it is difficult to achieve the same contrast practically available for a transmission backlit display. These above-mentioned disadvantages of reflective TFT and STN displays result mainly from a light-loss by the absorptive polarizer and from the angular dependency of the axis of polarization. In general, there is more than 60% optical loss. In the case of color display, light-loss is further aggravated due to the absorptive color filter which will cut off at least 60% incoming light.

U.S. Pat. No. 4,032,218 introduces a cholesteric color reflector and TN cell to display monochrome information on the black background. A quarter-wave plate is positioned between the cholesteric film and the TN display to convert circular polarization into linear polarization. A black coating is attached on the back of the device to absorb all the residual light passing from the cholesteric film. As a result, a viewer will sense a bright color light generated by the cholesteric color film on a black background.

U.S. Pat. No. 5,555,114 teaches cholesteric color selection layer, which selectively reflecting circularly polarized light of a specific wavelength and an optical layer formed on the color selection layer and having a liquid crystal and means for applying an electric field to the liquid crystal layer. A linear optical shifting layer on the top of cholesteric color filter convert circularly polarized light into linear polarization. This approach is not sufficient for a STN cell, a non-wave-guiding mode display, because of its non-linear optical performance due to the super twist dispersion to the incoming light. The color is actually the combination of color dispersion of birefringence of display cell and Bragg reflection from cholesteric color selection layer. In order to eliminate the color dispersion, different voltage will apply to different color pixels to convert the elliptical polarization into circular polarization, yet this make driving scheme very complicate or even impracticable.

U.S. Pat. No. 5,949,513 teaches a method of manufacturing a multi-color cholesteric display. The method includes the steps of: (1) deposition a twist agent on a first substrate, the twist agent becoming an in situ twist agent, (2) bringing a second substrate into proximity with the first substrate to form at least one interstitial region between the second and first substrates, (3) introducing liquid crystal having an initial pitch into the at least one interstitial region proximate the in situ twist agent and (4) stimulating the LC and the in situ twist agent to cause the LC and the in situ twist agent to mix in situ, the in situ twist agent to mix in situ, the in situ twist agent changing the initial pitch of the LC. A permanent polymer wall is necessary to isolate the LC of different pitch from flowing around. The multi-color cholesteric display takes advantage of the cholesteric Bragg reflection with spatial variable wavebands. But the shortcoming is the limited brightness due to the fact that only one circular polarization has been used.

U.S. Pat. No. 6,285,434 teaches a method of manufacturing a multi-color cholesteric display. The method introduces a substrate having a cell wall structure that enhances manufacturability by isolating the fluid fill ports corresponding to each set of independent cells, whereby each set of independent cells can be selectively-filled with a liquid crystal having desired properties. Thus, three colors of cholesteric liquid crystal material will be filled into the isolated channels sequentially by vacuum and/or capillary approaches. Again, the resulting cholesteric display is not bright enough compared with the color newspaper in the ordinary ambient environment due to the fact that only one handedness of the incident light has been utilized.

The applicant and the other research groups have tried multi-layers of cholesteric display cell structure in order to gain higher brightness for the full color display. But it causes very high complication and cost in terms of driving electronics and manufacturing process. The multi-layer itself adds more surface or interfacial reflection and absorption. As a result, the performance of such a multiple-layer-approach is, so far, not really satisfactory.

SUMMARY OF THE INVENTION

To address the above-mentioned deficiencies of the prior art, it is a primary objective of the present invention to provide a full color reflective cholesteric display while maintaining the cholesteric display's superiority such as high environmental contrast ratio, hemispheric viewing angle, zero-field long time memory and so on.

It is another objective of the present invention to provide a single layer cholesteric liquid crystal cell structure employing both handedness of the incident light, wherein the first handed circular polarization is reflected from the liquid crystal layer and the second handed circular polarization is reflected from the reflective circular polarizer, whereby the single layer cholesteric display produces color images with high brightness and contrast.

It is a further objective of the present invention to provide a polymeric cholesteric color filter with one handedness of circular polarization covering the whole visible wavelength.

It is another objective of the present invention to provide an absorptive micro-color filter with the same or different wavebands relative to the cholesteric liquid crystal coloring materials.

It is again another objective of the present invention to provide an electric controllable multi-color patterning cell structure, wherein the color out of the cholesteric liquid crystal, corresponding to the color out of the reflective micro-color filter, has a predetermined handedness of the circular polarization, which is opposite to the handedness of the reflective micro-color filter.

It is again another objective of the present invention to provide an electric controllable multi-color patterning structure including a reflective color filter made of an absorptive color filter and a non-patterned reflective circular polarizer film, wherein the color of the small molecular cholesteric liquid crystal, corresponding to the color of the absorptive color filter, has the opposite handedness to the reflective circular polarizer film.

It is another objective of the present invention to utilize the strong scattering effect of focal conic texture of the cholesteric liquid crystal and the directional reflection effect of the reflective color filter to create optical dark state.

It is still another objective of the present invention to provide a cholesteric planar area to guide the both handedness circular polarization out of the display in the optical ON state.

It is again another objective of the present invention to provide a cholesteric focal conic area to scatter and absorb the incident light in the optical OFF state.

It is the final objective of the present invention to provide a manufacturing process to produce a full color, full handedness, high brightness cholesteric liquid crystal display.

DETAILED DESCRIPTION

Figure 1:
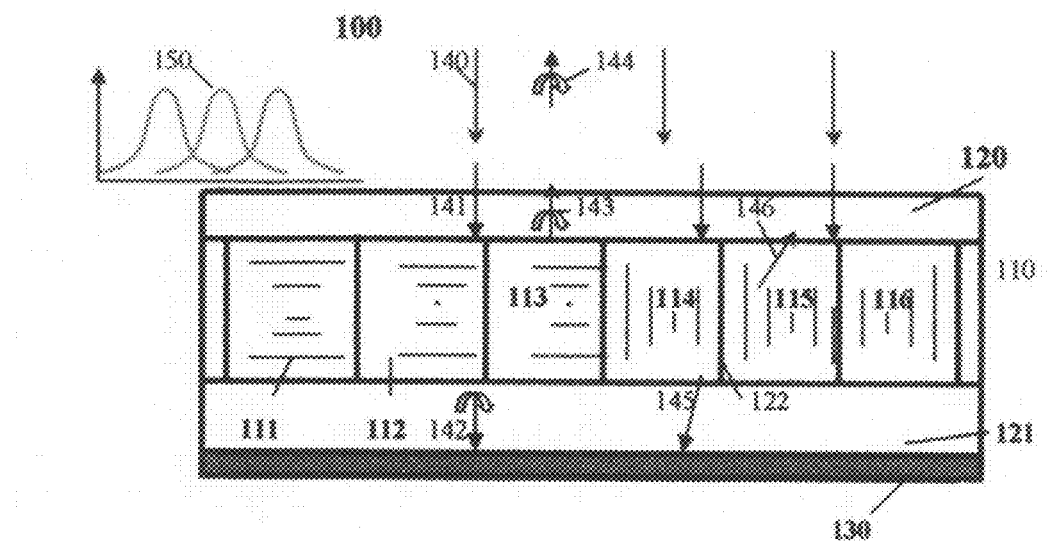
FIG. 1 illustrates a prior art schematic structure of a full color reflective display.

Referring first to FIG. 1, illustrated is the prior art schematic reflective display structure and its light reflective behavior. A cholesteric cell structure 110 includes a controllable planar texture 111, 112 and 113 and controllable focal conic texture 114, 115 and 116 respectively. The cholesteric cell structure is made of micro cell structure isolated by a micro-rib or wall structure 122. A set of transparent glass or plastic substrates with a thin film of conductive electrodes 120, 121 sandwiches the cholesteric cell structure, wherein the micro-rib structure 122 and the substrates 120 and 121 are physically attached together to form the micro-cell structure. In U.S. Pat. No. 5,949,513 and U.S. Pat. No. 6,285,434 the applicant describes that the R.G.B colors are directly generated from the controllable cholesteric planar texture 111, 112 and 113 respectively, herein incorporated by references. A black coating layer 130 is directly attached to the bottom of the display substrate 121 while an antiglare coating may or may not be positioned on the top of 120.

The cholesteric material in controllable planar texture has an intrinsic visible wave band 150 due to Bragg reflection, where the red color has longest pitch and blue has the shortest.

The light path in display's planar texture can be described as follows: The incoming light ray 140 passing through the front substrate 120 reaches cholesteric planar texture area (see light 141). Then the light 141 will be Bragg-reflected by each individual red 111, green 112 and blue 113 sub-pixel, and becomes circular polarized color light 143. All the non-reflected light 142 will be absorbed by the black coating 130. The color light 143 then passes through the display substrate 120, and finally becomes out-coming circular polarization 144.

On the other hand, when the light 141 hits on the cholesteric focal conic texture area, it will substantially become depolarized light 145. All those scattered light rays will pass through the substrate 121 and be absorbed by the black coating 130. Only a small portion of the light 146 will be back-scattered to the front viewer. As a result, only less than 5% of the total incident light has a chance to turn back in the cholesteric focal conic texture area.

However, there are two fundamental problems among the prior art technologies regarding the optical performances. Firstly, angular color dispersion due to the fact that the wavelength ($\lambda$) of the Bragg reflection has dependency to the viewing angle ($\theta$), $$\lambda = n\, p \cos\theta \quad (1)$$

where "n" represents the average refractive index and "p" the pitch of CLC material. When the light is illuminating at a normal angle to the display surface but it is viewed from an oblique angle $\theta$, the wavelength $\lambda$ will be getting shorter. This is called short-wavelength-color shift. Secondly, the brightness of red color is always not as good as the green and blue colors due to the less twisting power of cholesteric domains in the red region.

There is also a color bandwidth limitation due to the fact that the bandwidth ($\Delta\lambda$) of the Bragg reflection has dependency to the birefringence ($\Delta n$) of the CLC material, $$\Delta\lambda = \Delta n\, p = (n_e - n_o)p \quad (2)$$

where "$\Delta n$" represents the difference between extraordinary refractive index $n_e$ and ordinary refractive index $n_o$ of CLC material and "p" the pitch of CLC material. The resulting display looks dark compared with normal color newspaper. This is a common problem in U.S. Pat. No. 5,949,513 and U.S. Pat. No. 6,285,434, wherein the R.G.B colors are directly generated from the controllable CLC planar texture and the Bragg reflection of the colors and the color composition have a limited brightness due to the following reasons:

1. The prior art utilizes one portion of the incoming light. Only the light with the same handedness as the chiral liquid crystal material has a chance to be reflected back to the viewer.
2. In order for the display having a high brightness, the birefringence of CLC material should be as large as possible. However, there are limitation and restriction of the liquid crystal formulation in the actual display applications.

Figure 2:
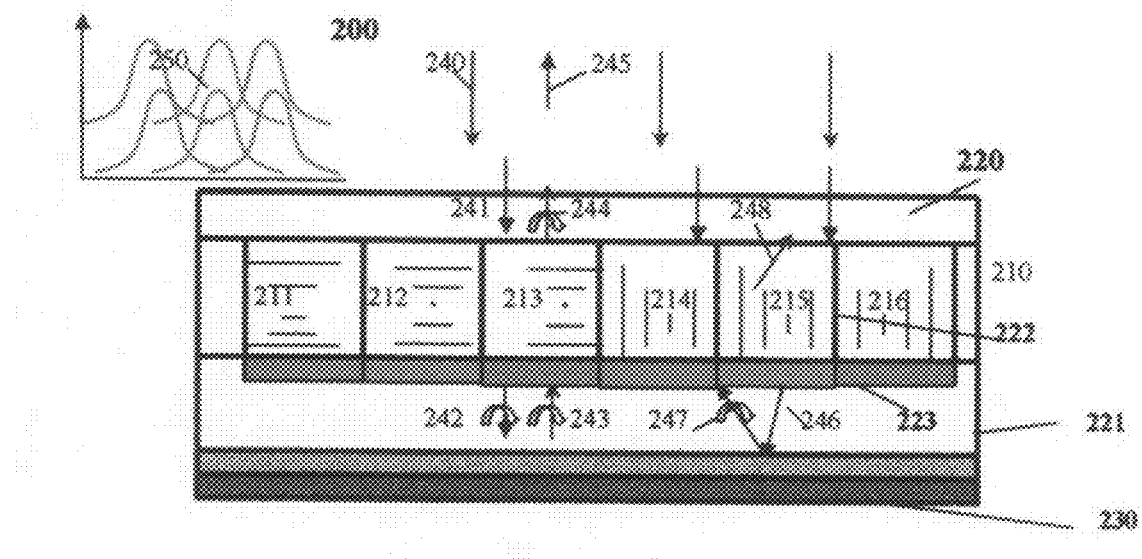
FIG. 2 illustrates a schematic drawing of the full color reflective display structure and its light behavior.

Turning now to FIG. 2, illustrated is a state-of-art reflective display structure and the optical behavior of the present invention.

A cholesteric cell structure 210 includes a controllable planar texture 211, 212 and 213 and controllable focal conic texture 214, 215 and 216 respectively. The cholesteric cell structure is made of micro cell tunnels isolated by a micro-rib or wall structure 222. A set of transparent glass or plastic substrates with a thin film of conductive electrodes 220, 221 sandwiches the cholesteric cell structure, wherein the micro-rib structure 212 and the substrates 220 and 221 are physically attached together to form the micro-cell structure. In U.S. Pat. No. 5,949,513 and U.S. Pat. No. 6,285,434 the applicant describes that the R.G.B colors are derived from the controllable cholesteric planar texture 211, 212 and 213 respectively, herein incorporated by references. What the difference between the present invention and the prior art is that an absorptive micro color filter array (ACF) 223 is deposited on the inner surface of the display substrate 221. The color of ACF 223 is corresponding to the color of the CLC micro-cell structure. A reflective circular polarizer film 230 is directly attached to the bottom of the display substrate 221 while an antireflective coating layer may be positioned on the top of 220. In this case, the polarity of the reflective circular polarizer 230 is exactly opposite to that of the cholesteric material. For example, right-handed cholesteric liquid crystal in the micro-cell structure and left-handed circular polarizer attached behind cholesteric cell structure. The circular polarizer can be made by different approaches, which will be described in detail immediately below.

The circular polarizer film can be of either diffusively reflective type or specula reflective type. The diffusively reflective circular polarizer produces the image with wide viewing angle but less contrast ratio, while the specula reflective circular polarizer generates a sharp image with higher contrast ratio. Considering the present full color display, wherein the brightness and the contrast ratio are the top priorities, the film with specula reflection is preferred.

The cholesteric material in controllable planar texture has an intrinsic visible wave band due to Bragg reflection, where the red color is of longest pitch and blue the shortest. The thickness of the color cell is designed in the range of 2~5μ, more preferably 2.5~3.0μ. The liquid crystal in the micro-cell structure is chosen as in table 1.

TABLE 1

|       | Red  | Green | Blue |
|-------|------|-------|------|
| $\lambda_0$ | 650  | 550   | 450  |
| n     | 1.5  | 1.5   | 1.5  |
| p     | 0.43 | 0.37  | 0.3  |
| D/p   | 3    | 3.2   | 4    |

In table 1, $\lambda_0$ is the center wavelength of CLC material, n is the average refractive index of the CLC, p is the pitch of CLC and D is the thickness of the micro-cell structure.

The average reflectivity for blue will reach 95% of the theoretical data while the red will reach approximately 80% of the theoretical data.

The light path in display's planar texture can be described as follows: The incoming light ray 240 passing through the front substrate 220 reaches cholesteric planar texture area (see light 241). Then the light 241 will be Bragg-reflected by each individual red 211, green 212 and blue 213 sub-pixel, and becomes right-handed circular polarized color light 244 (same as CLC). When the remaining light component passes through the ACF 223, Red, Green and Blue colors with left-handed polarization will be formed (see light 243), which are totally reflected by the left-handed reflective circularizer 230. Finally, both right-handed circular polarized light 244 and left-handed circular polarized light 243 will emerge to the front of the display as a neutral light 245. A viewer will sense a high brightness color image (optical ON state) 250 in the cholesteric planar area.

On the other hand, when the light 241 hits on the cholesteric focal conic texture area, it will substantially become depolarized, highly scattered light. Among those, 66% will be absorbed by the color filter ACF 223. Further more, half of the remaining light beam 246 with opposite handedness will pass through the circular polarizer 230 and be absorbed by the black coating layer of the circular polarizer. The second half of the light beam will be reflected by the specula circular polarizer as a circular polarization 247. It is very important to notice that due to the specula reflection, majority of light component 247 will hit on the different color filter window with different absorption wavelength, whereby being absorbed by the color filter layer of the display. The overall attenuations including the ACF absorption and the RCP absorption which can be called multi-path attenuation creates an optical dark state, wherein only a small portion of the light 248 will be back-scattered to the front viewer.

Obviously, the absorptive color filter 223 in the present invention plays a very important roll to achieve the present full color cholesteric display with high brightness and high contrast ratio. Firstly, the ACF 223 has optimal color spectrum being widely used in the current LCD industry. The transmittance bandwidth of the primary colors is much wider than that of the CLC Briggs reflections. The combination of the ACF 223 and RCP creates the second color reflection to the viewer. Secondly, the ACF 223 reproduces the color image with fixed color tint. This performance will remarkably improve the color quality of the cholesteric display by means of the modification of the color shift, an intrinsic shortcoming of the CLC material. Thirdly, the ACF 223 creates the darkness in the cholesteric focal conic area due to its absorption with the help of the scattering effect of the focal conic texture and the specula reflection effect of the reflective circular polarizer.

It is well-known in the art that the scattering effect of the focal conic texture can be remarkably enhanced by doping a small amount of polymeric material in the cholesteric liquid crystal and then thermo and/or UV cured under a certain alignment condition with or without the existence of the electric field.

The scattering effect can be further enhanced by the optimization of the dimensional ratio D/W. Herein D represents the depth of the scattering distance or the thickness of the substrate; while W represents the width of the color sub-pixel. The larger the ratio is the more light scattering it will be. Thus, high contrast ratio will be achieved. Normally, the D/W should be in the range of 3~10, preferably, 5~7.

Figure 3:
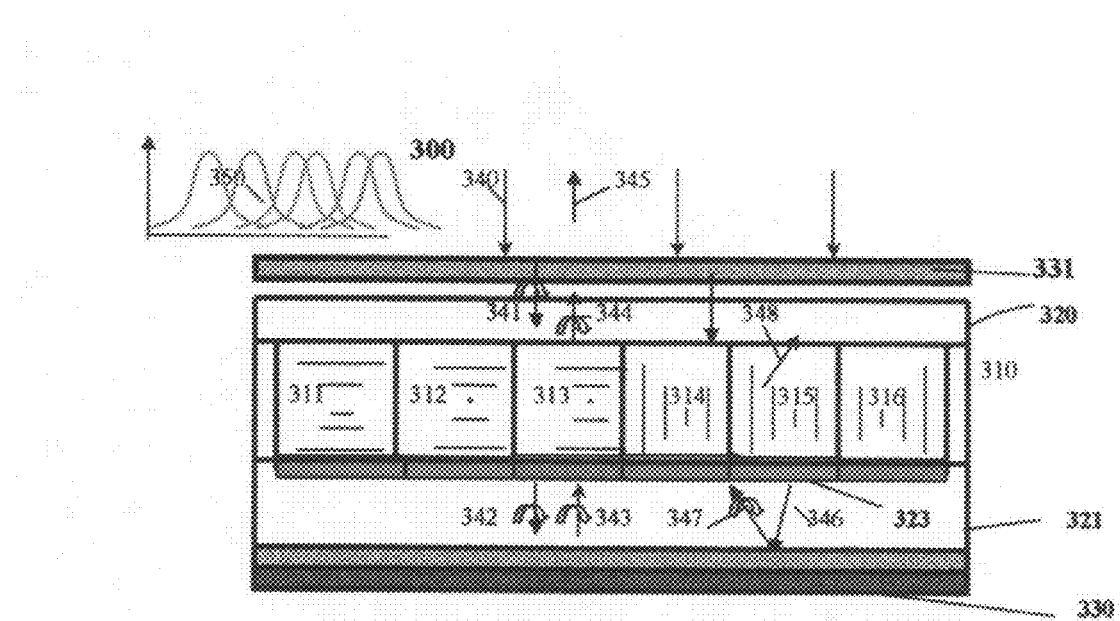
FIG. 3 illustrates another schematic drawing of the full color cholesteric display and its light behavior.

Turning now to FIG. 3, illustrated is a schematic sectional drawing of the full color cholesteric display. It consists of a display cell 310, a front absorptive circular polarizer (ACP) 331, back reflective circular polarizer (RCP) 330 and an absorptive color filter ACF 323. The cell 310 is a basic structure of liquid crystal display, wherein a CLC material with controllable planar texture 311, 312, 313 and controllable focal conic texture 314, 315, 316 are sandwiched between two patterned conductive substrates 320 and 321 (either glass or plastic), and isolated by a polymeric material. In this case, all the optical components including ACP, RCP and CLC are of the same optical polarity, for example, right handedness. The cell gap, which is predetermined by a spacer material, micro-balls or bars, is in the range of 1 to 5 micrometers. A thin polymer layer may be coated onto the inside of surfaces of the substrates to align the liquid crystal molecules in a specific way. An electronic waveform needs to connect to the conductive lead of the cell. A transparent conductive ITO patterning is structured on the top of the ACF layer 323. Because of the intrinsic stability of the cholesteric focal-conic texture and planar texture, no further alignment layer is absolutely necessary on the ITO patterning, and the CLC material may directly contact with ITO electrodes.

The light path in display's planar texture area can be described as follows: The incoming light ray 340 passing through the front ACP 331 becomes RH polarized light 341 with the intensity approximately half of the origin. When the light 341 incidents on CLC's planar texture with the same handedness, a portion of it will be Bragg-reflected by each individual red 311, green 312 and blue 313 sub-pixel, and becomes color light 344; When the remaining light reaches to ACF 323, it will be filtered out by each individual red, green and blue sub-segment, and becomes color light 342. Note, the color bandwidth of the cholesteric liquid crystal and the absorptive color filter are different, even though under the same name of "red", "green" and "blue". All the color light 342 will be reflected by the reflective circular polarizer 330 on the back side of the display to form the light 343. Thereafter, color light 343 passes through the CLC planar texture and through the front ACP 331.

Now, both the first color light 334 and the second color light 343 finally become emerging linear polarization 345, which will be captured by a viewer.

On the other hand, when the light 341 hits on the CLC's focal conic texture area, it will substantially become depolarized color light 346. All those lights, including newly generated LH component and non-selective reflected RH wave band 349, will pass through the ACF 323 and be absorbed by the filter accordingly. There will be an approximately 66% of light attenuation after the filtration. The remaining light will be further absorbed at least 50% by the black coating on the back side of the RCP 330. Only a small portion of the selected RH light 347 will be bounced back and depolarized again in the CLC's focal conic texture area. The depolarized light then passes through the front ACP 331 with the cost of more than 50% loss. Note that the scattering effect in CLC's focal conic texture not only depolarizes the light but also changes the light direction. The overall attenuations including color filter absorption, RCP absorption and the ACP attenuation which can be called bi-directional multi-path attenuation makes an ideal optical OFF state. As a result, only less than 2% of the total incident light has a chance to turn back to the viewer in the CLC's focal conic texture area.

As an example of the present invention, the spectrum of the Bragg reflection of the cholesteric sub-pixel and the color filter sub-segment is listed in Table 2.

TABLE 2

| λ(nm) | R | G | B |
|---|---|---|---|
| CLC1 | 650 | 560 | 480 |
| ACF1 | 600 | 510 | 450 |
| CLC2 | 620 | 550 | 490 |
| ACF2 | 600 | 510 | 450 |

The absorptive color filter was produced without Chrome mask. The coating thickness of ACF1 and ACF2 were 1.0 and 0.8 micrometer respectively. In order to increase the overall brightness, a weak circular polarizer film was adopted as described in the U.S. Pat. No. 7,564,518, herein incorporated by reference.

The present invention provides, for the first time, six colors in the reflective display, which achieves the following advantages:
1. Superior white balance. The whiteness is comparable with the newspaper, and its black/white working mode is better than that of the e-ink display.
2. High brightness. 30% total reflection can be realized within a certain viewing angle;
3. Ultra-high contrast ratio. A satisfactory darkness in the cholesteric focal conic area is achieved and the contrast ratio is twice as high as that of the newspaper,
4. Very low color dispersion and low view angle dependency.
5. High quality color image. The color gamut is remarkably enlarged. The ACF provides a wider spectrum than that of the cholesteric micro-cell structure.

The other advantageous approach of the present invention is to choose the CLC colors to match that of the absorptive color filter. It means that the center wavelength of the Bragg reflection of the CLC material is equal to the center wavelength of the transmission band. However, the latter is wider than the former, i.e. absorptive color filter has wider transmission bandwidth. Advantageously, the addition of ACF not only renders higher brightness than that of CLC reflective color described in the prior arts but also eliminates the angular color shift of the CLC reflective colors.

Another advantageous approach of the present invention is to choose the ACP 331 as a weak circular polarizer film, which leads both left-handed and right-handed polarizations to pass through it to a certain extent. In this case, the polarity of ACP 331 can be the same as CLC but different from RCP 330. For example, RCP is left-handed, while ACP and CLC are right-handed. The optical performance of such structure can be described as follows. In the display's planar texture area both right-handed and left-handed light with the same or different bandwidth will be reflected back to the front viewer (as indicated in FIG. 2) so that high brightness optical ON state is accomplished; In the display's focus conic texture area, on the other hand, the weak circular polarizer filtrates out the remaining scattered light to increase the darkness of the optical OFF state. As a result, high contrast ratio full color CLC display is obtained.

Figure 4:
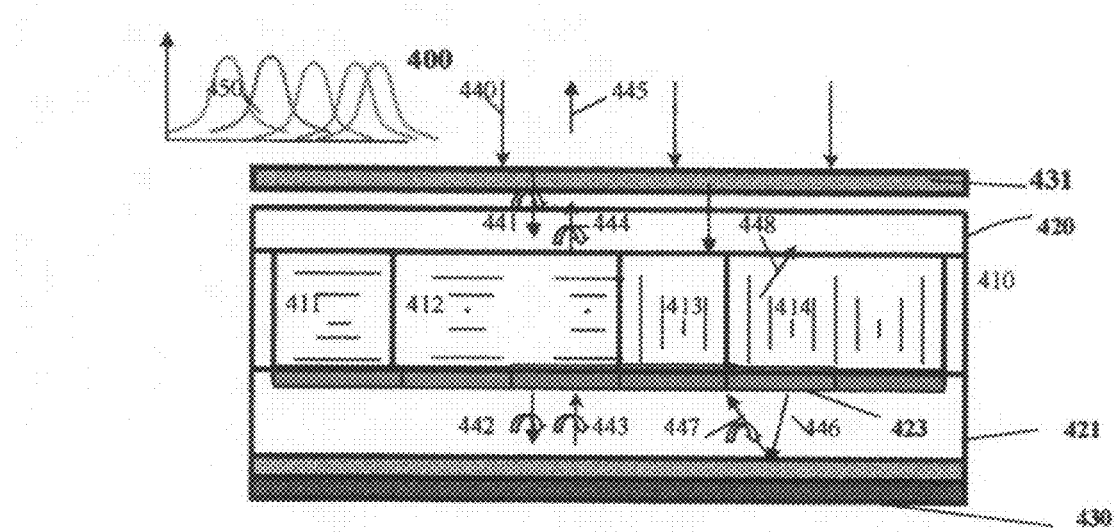
FIG. 4 illustrates a schematic drawing of the full color cholesteric display with two CLC color channels.

Turning now to FIG. 4, illustrated is a schematic sectional drawing of the full color cholesteric display with two CLC channels within the micro-cell structure. It consists of a display cell 410, a front absorptive circular polarizer (ACP) 431, back reflective circular polarizer (RCP) 430 and an absorptive color filter ACF 423. The cell 410 is a basic structure of liquid crystal display, wherein a CLC material with controllable planar texture 411, 412 and controllable focal conic texture 413, 414 are sandwiched between two patterned conductive substrates 420 and 421 (either glass or plastic), and isolated by a polymeric material. The difference between FIG. 4 and FIG. 3 is that the former has two channels CLC cell structure in stead of three channels, while the absorptive color filter ACF is remaining its three-primary-color segments and the conductive ITO electrode patterning is in alignment with the ACF color segment. In micro-cell 411 and 413, there is an intrinsic red color CLC material that corresponding to red color segment of the ACF. In micro-cell 412 and 414, on the other hand, there is a cyan (greenish blue) CLC material that corresponding both green and blue color segments of the ACF as shown in spectrum 450. In other word, the cyan micro-cell is two times as wide as the red micro-cell and it covers two sub-segments of both electrodes and ACF. In this case, all the optical components including ACP, RCP and CLC are of the same optical polarity, for example, right handedness. The cell gap, which is predetermined by a spacer material, micro-balls or bars, is in the range of 1 to 5 micrometers, preferably, 2 to 3 micrometers. A thin polymer layer may be coated onto the inside of surfaces of the substrates to align the liquid crystal molecules in a specific way. An electronic waveform needs to connect to the conductive lead of the cell. A transparent conductive ITO patterning is structured on the top of the ACF layer 423. Because of the intrinsic stability of the cholesteric focal-conic texture and planar texture, no further alignment layer is necessary on the lower ITO patterning, and the CLC material will directly contact with ITO electrodes.

The light path in display's planar texture can be described as follows: The incoming light ray 440 passing through the front CP 431 becomes RH polarized light 441 with the intensity approximately half of the origin. When the light 441 incidents on CLC's planar texture area with the same handedness, a portion of it will be Bragg-reflected by each individual red 411, cyan 412 sub-pixel, and becomes color light 444. When the remaining light reaches ACF, it will be filtrated out by each individual red, green and blue sub-segment, and becomes color light 442. And the color light 442 will be further reflected by the reflective circular polarizer 430 on the back side of the display to form the color 443. The color light 443 then passes through the CLC planar texture and CP 431 and reaches to the front side of the display. Now, both the first color light 434 and the second color light 443 finally become out-coming linear polarization 445. Due to the color addition of both light components, wide waveband primary colors, red, green and blue, will be displayed corresponding to the R.G.B color segments of ACF and ITO conductive patterning.

On the other hand, when the light 441 hits on the CLC's focal conic texture, it will substantially become depolarized color light 446. All those lights, including newly generated LH component and non-selective reflected RH wave band 449, will pass through the ACF 423 and be absorbed by the filter accordingly. It costs approximately 66% light attenuation. The remaining light will be further absorbed at least 50% by the black coating layer on the back side of the RCP 430. Only a small portion of the selected RH light 447 will be bounced back and depolarized again in the CLC's focal conic texture. The depolarized light then passes through the front CP 431 with the cost of more than 50% loss. Note that the scattering effect in CLC's focal conic texture area not only depolarizes the light but changes the light direction as well. The remaining light will be further attenuated by the interfacial surface-reflection. As a result, only less than 2% of the total incoming light has a chance to reach to the front surface.

In U.S. Pat. No. 6,285,434 the applicant describes detailed manufacturing process of the two channel micro-cell structure and related filling procedures, herein incorporated by reference. The two channel micro-cell structure has some advantages over three channels, which will be summarized as follows:

1. Remarkably simplified the display cell fabrication. Traditional three channel structure involves two cutting fabrication processes: three CLC formulations with different colors are filling into the opening channels three times sequentially by means of vacuum and capillary effect
2. Blue color CLC material normally has higher viscosity and higher driving voltage due to its higher percentage of chiral doping material and smaller helical pitch. Accordingly, the respond time is much slower than the material with longer wavelengths.
3. The two channel micro-cell structure allows the two colors of CLC formulations to fill into the channel from two opposite sides simultaneously in a vacuum condition. The CLC material has lower viscosity so that the filling process becomes much faster. More importantly, there will be no substrate cutting is required.

Please note that the two channel micro-cell structure and the optical principle are also valid for the display structure described in FIG. 2. The above-mentioned two color channels are not limited to the red and cyan colors, other group of colors, for instance, yellow and blue cholesteric liquid crystals can be also filled into the channels. There is no necessity to repeat the filling process in detailed descriptions.

Figure 5:
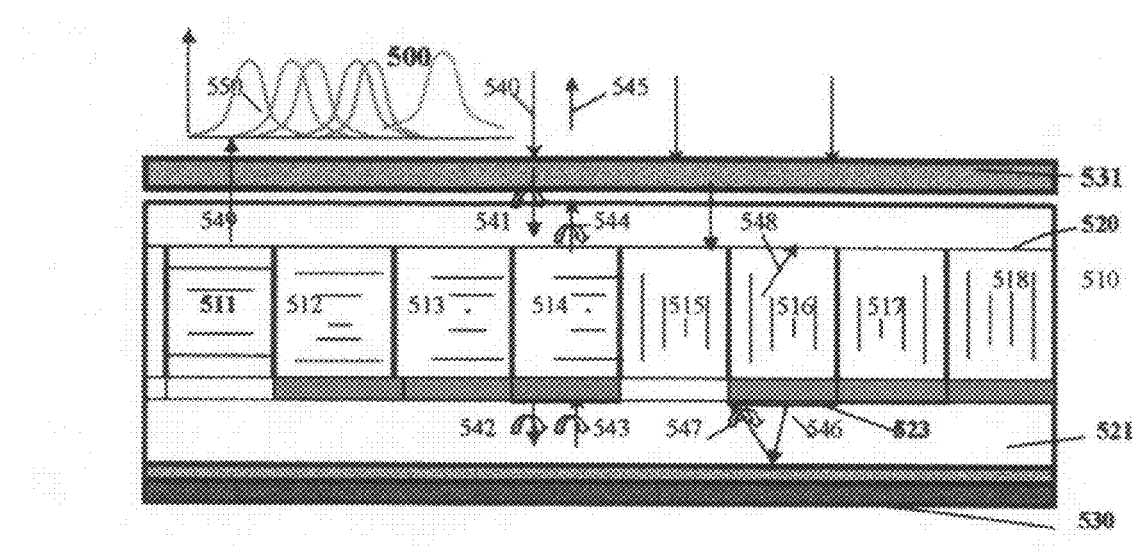
FIG. 5 illustrates a schematic drawing of the full color cholesteric display with four CLC color channels.

Turning now to FIG. 5, illustrated is a schematic sectional drawing of the full color cholesteric display with four color channels. It consists of a display cell 510, a front absorptive circular polarizer (ACP) 531, back reflective circular polarizer (RCP) 530 and an absorptive color filter ACF 523. The cell 510 is a basic structure of liquid crystal display, wherein a CLC material with controllable planar texture 511, 512, 513, 514 and controllable focal conic texture 515, 516, 517, 518 are sandwiched between two patterned conductive substrates 520 and 521 (either glass or plastic), and isolated by a polymeric material. Those CLC with infra-red Bragg reflection, CLC with red Bragg reflection, CLC with green Bragg reflection and CLC with blue Bragg reflection are filled sequentially into first channel 511 and 515, the second channel 512 and 516, the third channel 513 and 517 and the forth channel 514 and 518 respectively.

Accordingly, the absorptive color filter ACF 523 has four micro color arrays: white, red, green and blue. The white array, i.e., the blank acrylic sub-segment without pigment, is corresponding to the infra-red CLC channel.

In this case, all the optical components including ACP, RCP and CLC are of the same optical polarity, for example, right handedness. The cell gap, which is predetermined by a spacer material, micro-balls or bars, is in the range of 1 to 5 micrometers. A thin polymer layer may be coated onto the inside of surfaces of the substrates to align the liquid crystal molecules in a specific way. An electronic waveform needs to connect to the conductive lead of the cell. A transparent conductive ITO patterning is structured on the top of the ACF layer 523. Because of the intrinsic stability of the cholesteric focal-conic texture and planar texture, no further alignment layer is absolutely necessary on the ITO patterning, and the CLC material may directly contact with the conductive ITO electrodes.

The light path in display's planar texture can be described as follows: The incoming light ray 540 passing through the front ACP 531 becomes RH polarized light 541. When the light 541 incidents on CLC's planar texture area with the same handedness, a portion of it will be Bragg-reflected by each individual red 512, green 513 and blue 514 sub-pixel, and becomes color light 544; When the remaining light reaches ACF 523, it will be filtrated out by each individual red, green and blue sub-segment, and becomes color light 542. Note, the color bandwidth of the cholesteric liquid crystal and the absorptive color filter are different, even though under the same name of "red", "green" and "blue". The color light 542 will be reflected by the reflective circular polarizer 530 on the back side of the display. The color light 543 will pass through the CLC planar texture and through the front ACP 531. Both the first color light 544 and the second color light 543 finally become emerging color linear polarization 545, which will be captured by a viewer.

When the light 541 incidents on CLC's infra-red sub-pixel area, it will directly pass through the white sub-segment of the ACF 523 and then be reflected by the RCP 530, passing through ACF 523 and ACP 531 again and finally reached out as a white light 549.

Now, in the display's planar texture area there will be two light components: color light 545 and white light 549. It is obvious that the brightness or whiteness of the novel display will be enhanced remarkably. If a weak circular polarizer is laminated on the front, the total light reflection will be up to 40% of incident light 541.

On the other hand, when the light 541 hits on the CLC's focal conic texture, it will substantially become depolarized color light 546. All those lights, including newly generated LH component and non-selective reflected RH wave band, will pass through the ACF 523 and be absorbed by the color filter accordingly. There will be approximately 66% light attenuation after the filtration of the color filter. The remaining light will be further absorbed at least 50% by the black coating of the RCP 530. Only a small portion of the selected RH light 547 will be bounced back and depolarized again in the CLC's focal conic texture. The depolarized light then passes through the front ACP 531 with the cost of more than 50% loss. Note that the scattering effect in CLC's focal conic texture not only depolarizes the light but changes the light direction as well. The overall attenuations including color filter absorption, RCP absorption and the ACP attenuation which can be called bi-directional multi-path attenuation makes an ideal optical OFF state. As a result, only less than 2% of the total incident light has a chance to turn back to the viewer.

As an example of the present invention, the spectrum of the Bragg reflection of the cholesteric sub-pixel and the color filter sub-segment is listed in Table 3.

TABLE 3

| λ(nm) | IR | R | G | B |
|---|---|---|---|---|
| CLC1 | 760 | 650 | 560 | 480 |
| ACF1 | Blank | 600 | 510 | 450 |
| CLC2 | 760 | 620 | 550 | 490 |
| ACF2 | Blank | 600 | 510 | 450 |

The absorptive color filter was produced without Chrome mask. The coating thickness of ACF1 and ACF2 were 1.0 and 0.8 micrometer respectively. In order to increase the overall brightness, a weak circular polarizer film was adopted as described in the U.S. Pat. No. 7,564,518, herein incorporated by reference.

I claim:

1. A full color reflective display comprising:
   a. a reflective circular polarizer with a predetermined polarity,
   b. a cholesteric liquid crystal with a predetermined polarity and at least two reflective colors,
   c. an absorptive color filter film with at least three colors,
   d. a plurality of transparent conductive patterned substrates juxtaposed to form a cell structure,
   e. a plurality of polymer rib structure within patterned substrates to form a enclosed cholesteric micro-cell structure,
   wherein the cell structure, including the cholesteric liquid crystal, is positioned at the viewing side, while the color filter film is positioned at the inside of the conductive patterned substrate opposite to the viewing side corresponding to the conductive pattern of the substrate and to the micro-cell structure of the cholesteric material,
   wherein the reflective circular polarizer is laminated at the backside of the cell structure,
   whereby a full color reflection with two polarities will be displayed in the cholesteric planar texture area and a dark state will be displayed in the cholesteric focal conic texture area.

2. The display as in claim 1 wherein the reflective circular polarizer is a diffusive cholesteric broad-band polarizer.

3. The display as in claim 1 wherein the reflective circular polarizer is a specula cholesteric broad-band polarizer.

4. The display as in claim 1 wherein the reflective circular polarizer is a diffusive reflective linear polarizer laminated with a quarter wave plate.

5. The display as in claim 1 wherein the reflective circular polarizer is a specula reflective linear polarizer laminated with a quarter wave plate.

6. The display as in claim 1 wherein the cholesteric liquid crystal is of red, green and blue colors.

7. The display as in claim 1 wherein the cholesteric liquid crystal is of red and cyan colors.

8. The display as in claim 1 wherein the cholesteric liquid crystal is of yellow and blue colors.

9. The display as in claim 1 wherein the first polarity and the second polarity are opposite to each other.

10. The display as in claim 1 wherein the full color reflection in the planar texture area is right-handed and left-handed light reflections.

11. The display as in claim 1 wherein the full color reflection in the planar texture area is at least 30% of the total incident light.

12. The display as in claim 1 wherein the dark state in the focal conic texture area is created by multi-path light attenuation.

13. A full color reflective display comprising:
   a. an absorptive circular polarizer with a predetermined polarity,
   b. a reflective circular polarizer with a predetermined polarity,
   c. a cholesteric liquid crystal with a predetermined polarity and at least two reflective colors,
   d. an absorptive color filter film with at least three colors,
   e. a plurality of transparent conductive patterned substrates juxtaposed to form a cell structure,
   f. a plurality of polymer rib structure within patterned substrates to form a enclosed cholesteric micro-cell structure,
   wherein the cell structure, including the cholesteric liquid crystal, is positioned at the viewing side, while the color filter film is positioned at the inside of the conductive patterned substrate opposite to the viewing side corresponding to the conductive pattern of the substrate and to the micro-cell structure of the cholesteric material,
   wherein the absorptive circular polarizer is laminated at the front side of the cell structure and the reflective circular polarizer is laminated at the backside of the cell structure,
   whereby a full color reflection with full bandwidth will be displayed in the cholesteric planar texture area and a dark state will be displayed in the cholesteric focal conic texture area.

14. The display as in claim 13 wherein the absorptive circular polarizer and the reflective circular polarizer have the same polarity.

15. The display as in claim 13 wherein the absorptive circular polarizer and the reflective circular polarizer have opposite polarity.

16. The display as in claim 15 wherein the absorptive circular polarizer is a weak absorptive circular polarizer film.

17. The display as in claim 13 wherein the full color reflection with full bandwidth is of the same polarity of the circular polarization.

18. The display as in claim 13 wherein the full color reflection with full bandwidth is of opposite polarity of the circular polarization.

19. The display as in claim 13 wherein the full color reflection in the planar texture area is of white, red, green and blue color reflections.

20. The display as in claim 13 wherein the full color reflection in the planar texture area is at lease 30% of the total incident light.

* * * * *